US012598582B2

(12) United States Patent
Hong

(10) Patent No.: US 12,598,582 B2
(45) Date of Patent: Apr. 7, 2026

(54) PAGING CONFIGURATION METHODS AND APPARATUSES, PAGING METHODS AND APPARATUSES

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 360 days.

(21) Appl. No.: 18/034,600

(22) PCT Filed: Oct. 30, 2020

(86) PCT No.: PCT/CN2020/125403
§ 371 (c)(1),
(2) Date: Apr. 28, 2023

(87) PCT Pub. No.: WO2022/088073
PCT Pub. Date: May 5, 2022

(65) Prior Publication Data
US 2023/0379879 A1 Nov. 23, 2023

(51) Int. Cl.
*H04W 68/02* (2009.01)
*H04W 68/00* (2009.01)
(52) U.S. Cl.
CPC .................................... *H04W 68/02* (2013.01)
(58) Field of Classification Search
CPC ...................................................... H04W 68/02
USPC ........................................................ 370/329
See application file for complete search history.

(56) References Cited

U.S. PATENT DOCUMENTS

| | | | |
|---|---|---|---|
| 2009/0215472 A1 | 8/2009 | Hsu | |
| 2009/0215473 A1 | 8/2009 | Hsu | |
| 2013/0225211 A1 | 8/2013 | Lebreton et al. | |
| 2014/0128082 A1 | 5/2014 | Chirayil | |

(Continued)

FOREIGN PATENT DOCUMENTS

| | | |
|---|---|---|
| CN | 106455015 A | 2/2017 |
| CN | 107623900 | 1/2018 |

(Continued)

OTHER PUBLICATIONS

State Intellectual Property Office of the People's Republic of China, Office Action and Search Report Issued in Application No. 2020800029963, Sep. 30, 2022, 12 pages.(Submitted with Machine/Partial Translation).

(Continued)

*Primary Examiner* — Mark G. Pannell
(74) *Attorney, Agent, or Firm* — Volpe Koenig

(57) ABSTRACT

A paging configuration method, an electronic device, and a computer readable storage medium are provided. The paging configuration method is performed by a terminal, where at least a first SIM card and a second SIM card are arranged in the terminal. The method includes: in response to predicting collisions between paging occasions for the first SIM card to receive a paging message and paging occasions for the second SIM card to receive a paging message, configuring the first SIM card to receive the paging message at first paging occasions of collided paging occasions, and/or configuring the second SIM card to receive the paging message at second paging occasions of the collided paging occasions.

18 Claims, 10 Drawing Sheets

In response to predicting collisions between paging occasions for the first SIM card to receive a paging message and paging occasions for the second SIM card to receive a paging message, according to communication parameters required by the first service type, determine a first number of paging occasions from the collided paging occasions as the first paging occasions; and/or according to communication parameters required by the second service type, determine a second number of paging occasions from the collided paging occasions as the second paging occasions

~S501

(56) References Cited

U.S. PATENT DOCUMENTS

| | | | | |
|---|---|---|---|---|
| 2015/0163827 | A1 | 6/2015 | Ekici | |
| 2018/0368099 | A1 | 12/2018 | Chen et al. | |
| 2019/0335420 | A1 | 10/2019 | You et al. | |
| 2020/0128391 | A1 | 4/2020 | Yun | |
| 2020/0359196 | A1* | 11/2020 | Balasubramaniam | ..................... |
| | | | | H04W 88/06 |
| 2021/0014822 | A1* | 1/2021 | Gurumoorthy | ....... H04W 68/02 |
| 2021/0022111 | A1* | 1/2021 | Kumar | ................. H04W 68/02 |
| 2021/0337505 | A1* | 10/2021 | Krishnamoorthy | ......................... |
| | | | | H04W 56/001 |
| 2022/0256501 | A1* | 8/2022 | Peng | ..................... H04W 8/205 |
| 2022/0264522 | A1* | 8/2022 | Brusilovsky | .......... H04W 48/18 |
| 2022/0287004 | A1* | 9/2022 | Fujishiro | ............... H04W 68/02 |
| 2022/0322286 | A1* | 10/2022 | Han | ...................... H04W 68/10 |
| 2022/0394669 | A1* | 12/2022 | Cai | ...................... H04W 68/02 |

FOREIGN PATENT DOCUMENTS

| | | | |
|---|---|---|---|
| CN | 107623900 | A | 1/2018 |
| CN | 107690134 | A | 2/2018 |
| CN | 108632995 | A | 10/2018 |
| CN | 110149695 | A | 8/2019 |
| CN | 110677900 | A | 1/2020 |
| CN | 111294789 | A | 6/2020 |
| CN | 111512657 | A | 8/2020 |
| CN | 111586841 | A | 8/2020 |
| CN | 111630911 | A | 9/2020 |
| WO | 2018176219 | A1 | 10/2018 |
| WO | 2020124057 | A1 | 6/2020 |
| WO | 2020238127 | A1 | 12/2020 |

OTHER PUBLICATIONS

ISA State Intellectual Property Office of the People's Republic of China, International Search Report Issued in Application No. PCT/CN2020/125403, Jul. 27, 2021, WIPO, 4 pages.

Qualcomm Incorporated, "Handling of paging collision for Multi-SIM", 3GPP TSG-RAN WG2 Meeting #111-e R2-2006944, Aug. 28, 2020, 4 pages.

Huawei, HiSilicon, "Procedure collision handling in paging and notification procedure", 3GPP TSG-CT WG1 Meeting #113 C1-188273, Nov. 19, 2018, 4 pages.

State Intellectual Property Office of the Peoples Republic of China, Office Action and Search Report Issued in Application No. 2020800029963, Jun. 29, 2023, 17 pages. (Submitted with Machine Translation).

Qualcomm Incorporated et al, "Avoidance of paging collisions to minimize outage of services", SA WG2 Meeting #122,S2-174243,Jun. 26-30, 2017, San Jose Del Cabo , Mexico,8 pages.

Huawei, HiSilicon, "Discussion on Paging Related Issues", SA WG2 Meeting #135,S2-1909264,Split, Croatia, Oct. 14-18, 2019, 3 pages.

Lenovo, Motorola Mobility , "Definition and solution for paging collision, RRC Inactive, SI change", 3GPP TSG-RAN WG2 Meeting #112 electronic, R2-2009692,Online, Nov. 2-13, 2020, 4 pages.

ISA State Intellectual Property Office of the Peoples Republic of China, Written Opinion of the International Searching Authority Issued in Application No. PCT/CN2020/125403, Jul. 27, 2021, WIPO, 10 pages.

* cited by examiner

Figures 1, 2, 3:
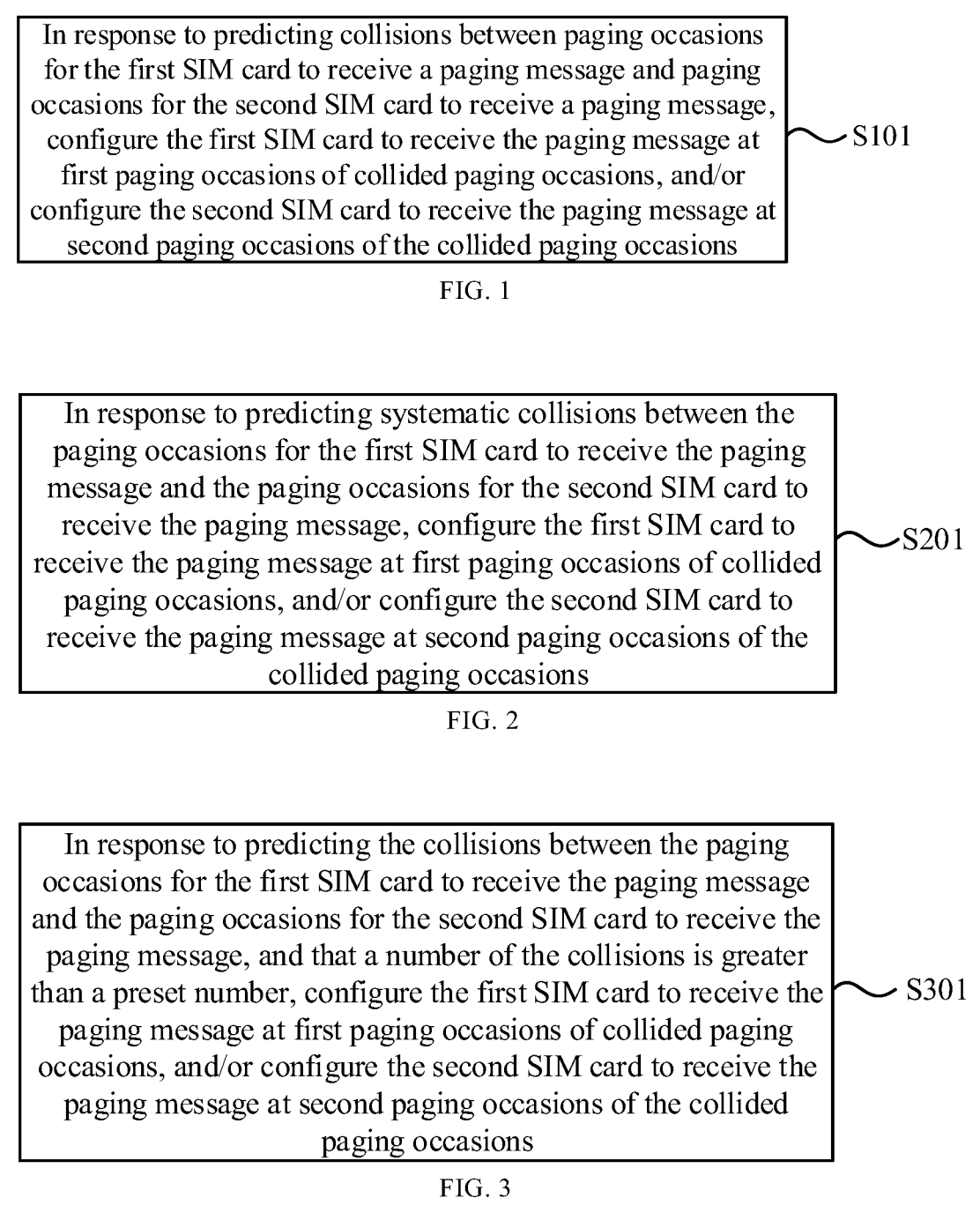

In response to predicting collisions between paging occasions for the first SIM card to receive a paging message and paging occasions for the second SIM card to receive a paging message, configure the first SIM card to receive the paging message at first paging occasions of collided paging occasions, and/or configure the second SIM card to receive the paging message at second paging occasions of the collided paging occasions

In response to predicting systematic collisions between the paging occasions for the first SIM card to receive the paging message and the paging occasions for the second SIM card to receive the paging message, configure the first SIM card to receive the paging message at first paging occasions of collided paging occasions, and/or configure the second SIM card to receive the paging message at second paging occasions of the collided paging occasions

In response to predicting the collisions between the paging occasions for the first SIM card to receive the paging message and the paging occasions for the second SIM card to receive the paging message, and that a number of the collisions is greater than a preset number, configure the first SIM card to receive the paging message at first paging occasions of collided paging occasions, and/or configure the second SIM card to receive the paging message at second paging occasions of the collided paging occasions

In response to predicting collisions between paging occasions for the first SIM card to receive a paging message and paging occasions for the second SIM card to receive a paging message, according to a first service type corresponding to the paging message received by the first SIM card, configure the first SIM card to receive the paging message at the first paging occasions of the collided paging occasions; and/or according to a second service type corresponding to the paging message received by the second SIM card, configure the second SIM card to receive the paging message at the second paging occasions of the collided paging occasions

In response to predicting collisions between paging occasions for the first SIM card to receive a paging message and paging occasions for the second SIM card to receive a paging message, according to communication parameters required by the first service type, determine a first number of paging occasions from the collided paging occasions as the first paging occasions; and/ or according to communication parameters required by the second service type, determine a second number of paging occasions from the collided paging occasions as the second paging occasions

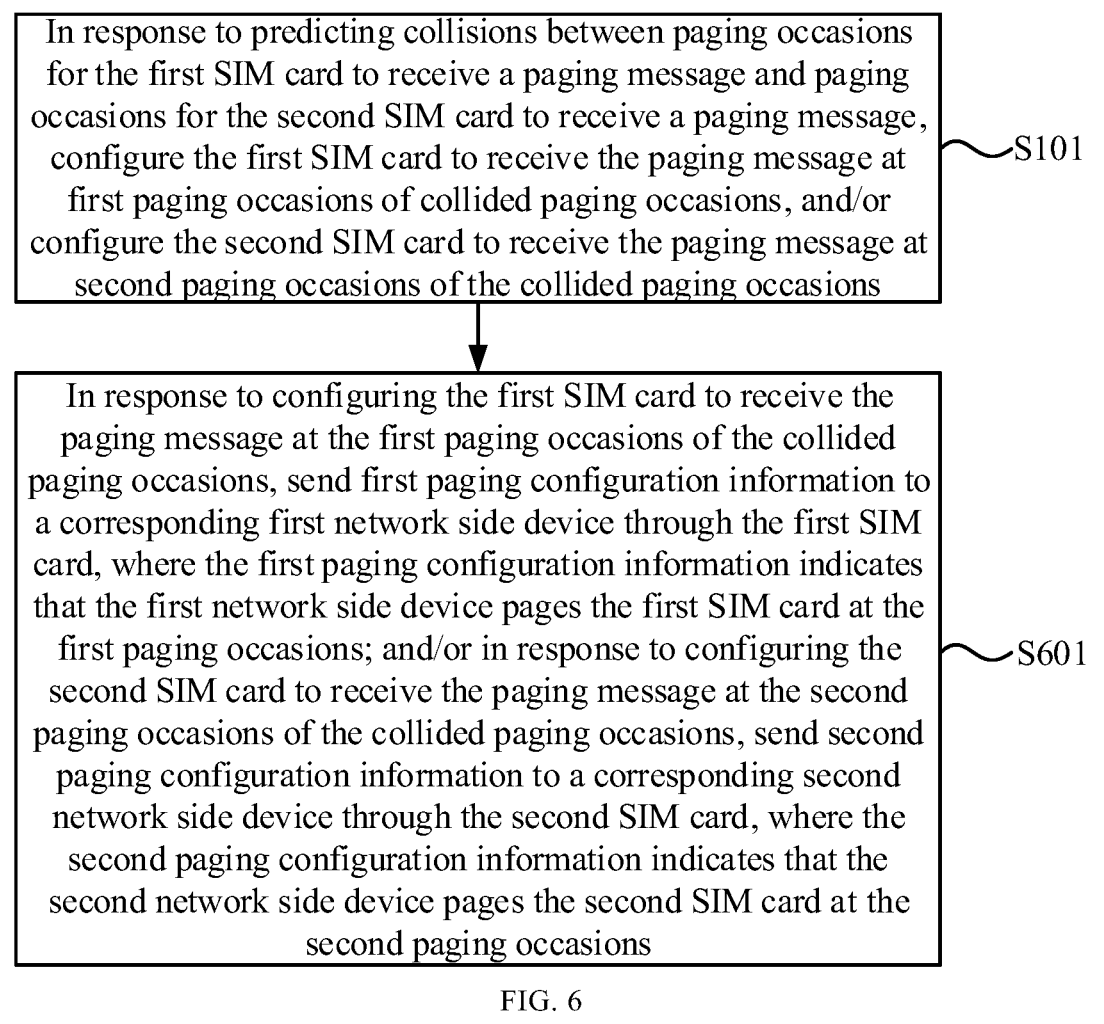

In response to predicting collisions between paging occasions for the first SIM card to receive a paging message and paging occasions for the second SIM card to receive a paging message, configure the first SIM card to receive the paging message at first paging occasions of collided paging occasions, and/or configure the second SIM card to receive the paging message at second paging occasions of the collided paging occasions ~S101

In response to configuring the first SIM card to receive the paging message at the first paging occasions of the collided paging occasions, send first paging configuration information to a corresponding first network side device through the first SIM card, where the first paging configuration information indicates that the first network side device pages the first SIM card at the first paging occasions; and/or in response to configuring the second SIM card to receive the paging message at the second paging occasions of the collided paging occasions, send second paging configuration information to a corresponding second network side device through the second SIM card, where the second paging configuration information indicates that the second network side device pages the second SIM card at the second paging occasions ~S601

FIG. 6

Figure 7:
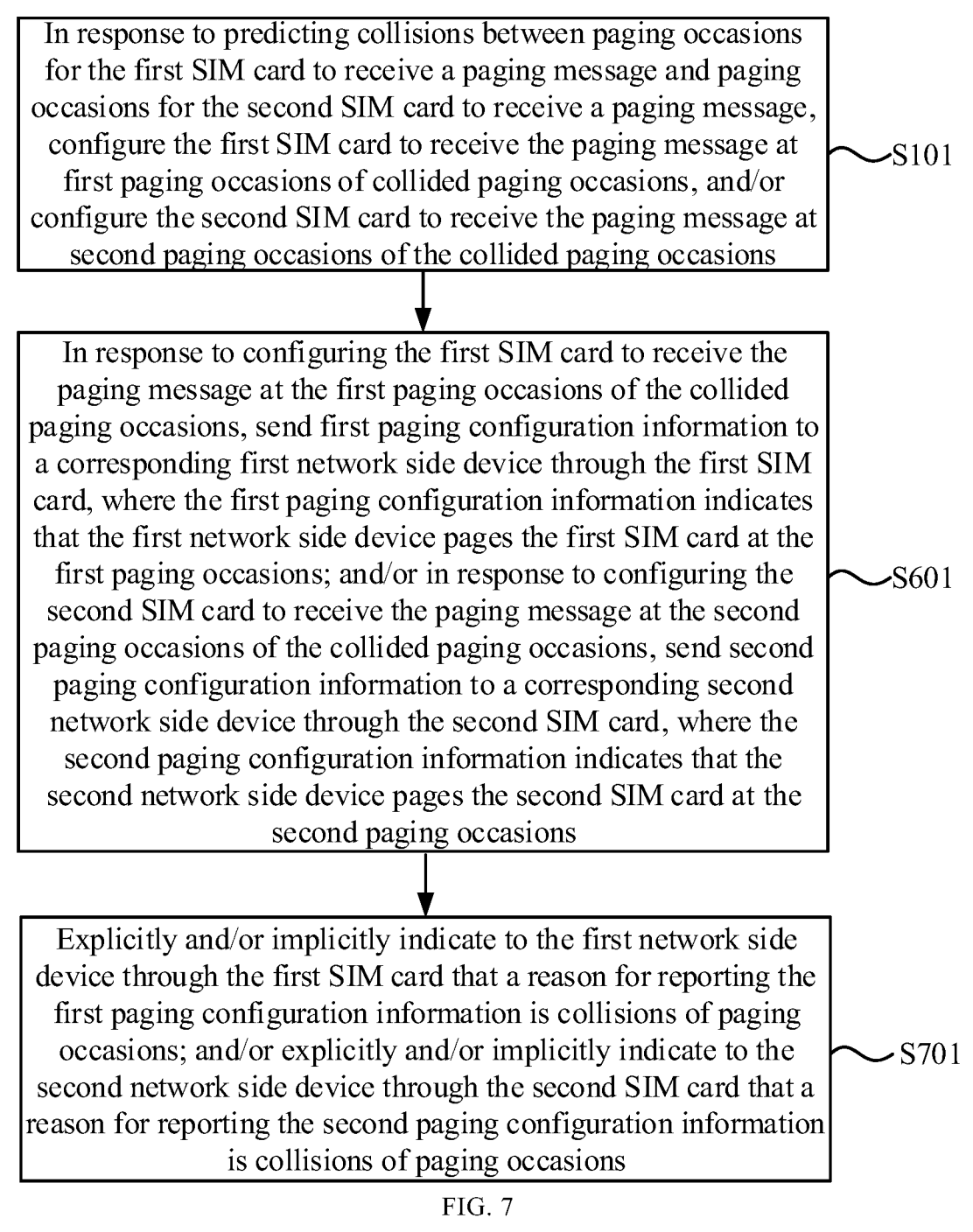

In response to predicting collisions between paging occasions for the first SIM card to receive a paging message and paging occasions for the second SIM card to receive a paging message, configure the first SIM card to receive the paging message at first paging occasions of collided paging occasions, and/or configure the second SIM card to receive the paging message at second paging occasions of the collided paging occasions

~S101

In response to configuring the first SIM card to receive the paging message at the first paging occasions of the collided paging occasions, send first paging configuration information to a corresponding first network side device through the first SIM card, where the first paging configuration information indicates that the first network side device pages the first SIM card at the first paging occasions; and/or in response to configuring the second SIM card to receive the paging message at the second paging occasions of the collided paging occasions, send second paging configuration information to a corresponding second network side device through the second SIM card, where the second paging configuration information indicates that the second network side device pages the second SIM card at the second paging occasions

~S601

Explicitly and/or implicitly indicate to the first network side device through the first SIM card that a reason for reporting the first paging configuration information is collisions of paging occasions; and/or explicitly and/or implicitly indicate to the second network side device through the second SIM card that a reason for reporting the second paging configuration information is collisions of paging occasions

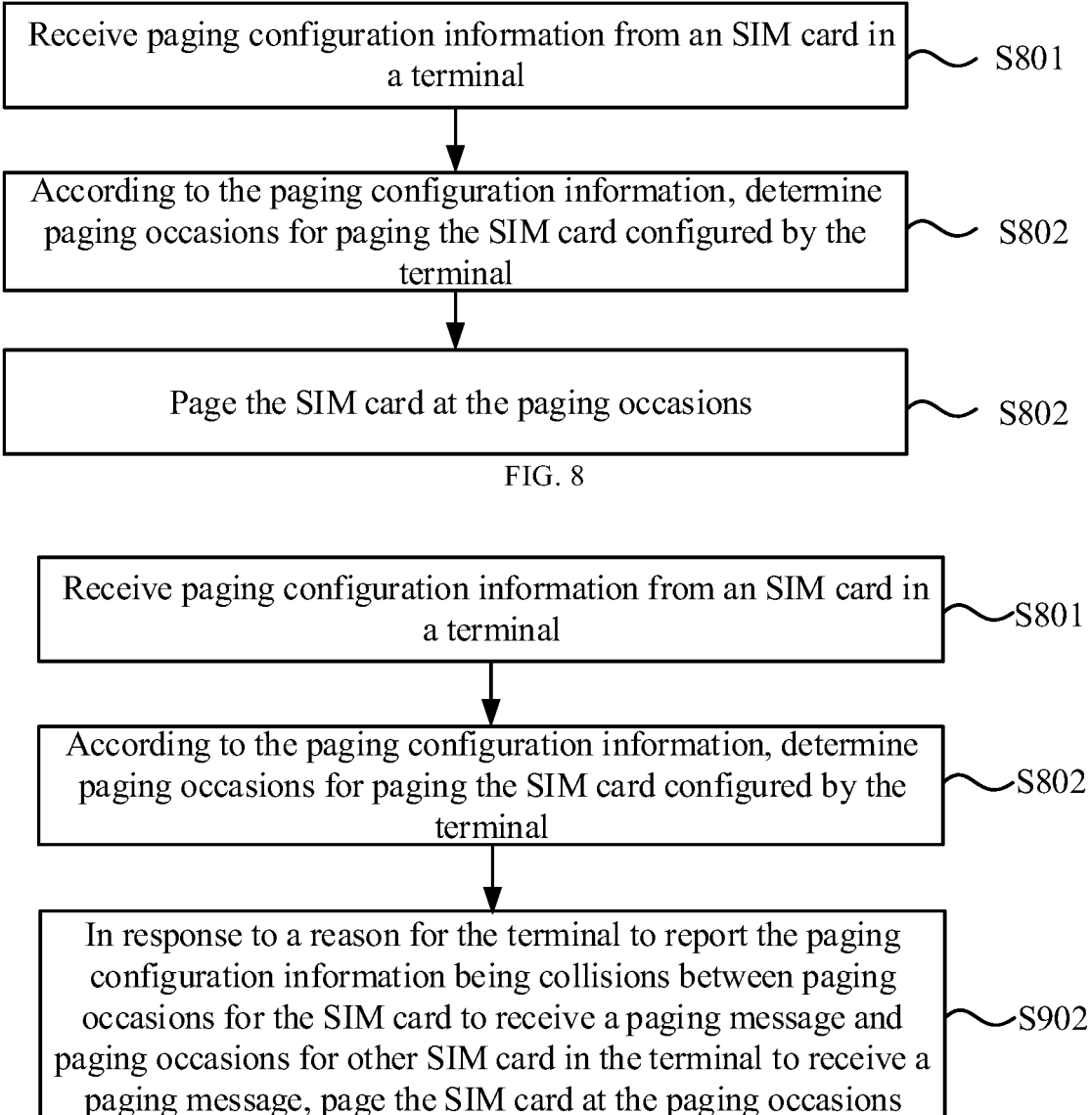

| Receive paging configuration information from an SIM card in a terminal | S801 |
| According to the paging configuration information, determine paging occasions for paging the SIM card configured by the terminal | S802 |
| Page the SIM card at the paging occasions | S802 |

FIG. 8

| Receive paging configuration information from an SIM card in a terminal | S801 |
| According to the paging configuration information, determine paging occasions for paging the SIM card configured by the terminal | S802 |
| In response to a reason for the terminal to report the paging configuration information being collisions between paging occasions for the SIM card to receive a paging message and paging occasions for other SIM card in the terminal to receive a paging message, page the SIM card at the paging occasions | S902 |

FIG. 9

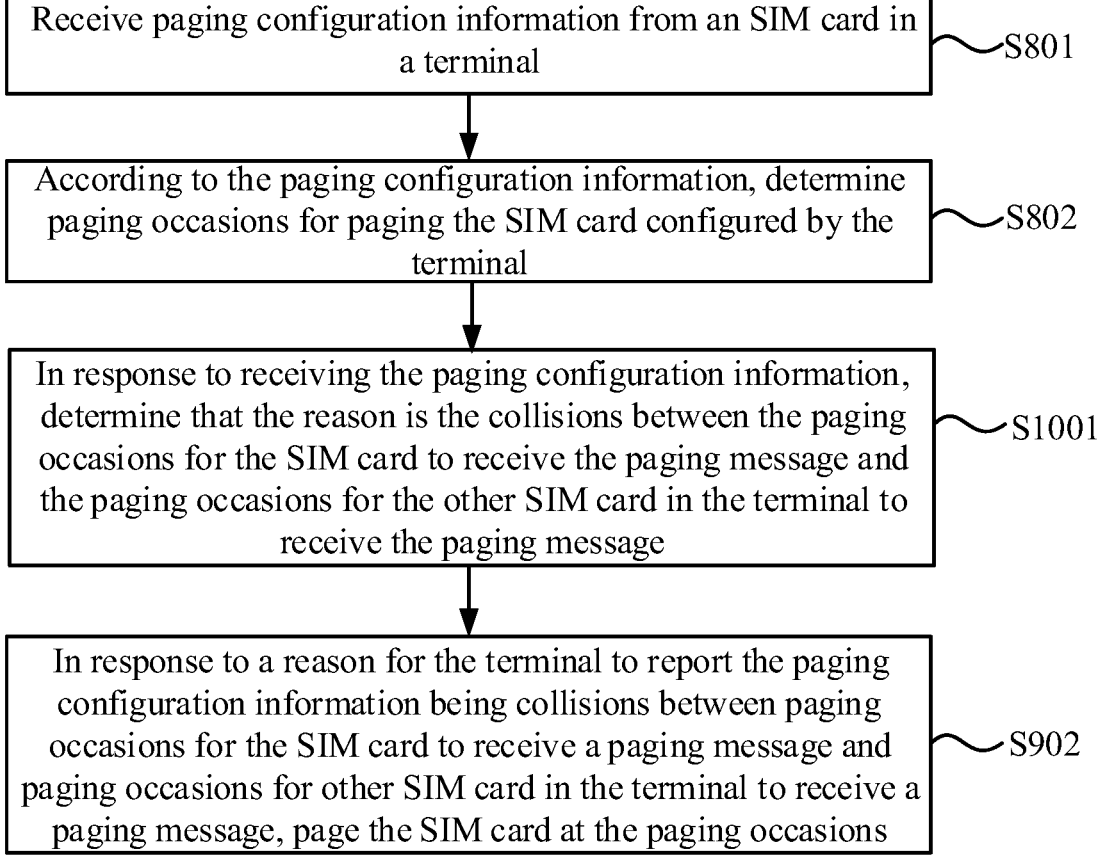

Receive paging configuration information from an SIM card in a terminal ⟿S801

According to the paging configuration information, determine paging occasions for paging the SIM card configured by the terminal ⟿S802

In response to receiving the paging configuration information, determine that the reason is the collisions between the paging occasions for the SIM card to receive the paging message and the paging occasions for the other SIM card in the terminal to receive the paging message ⟿S1001

In response to a reason for the terminal to report the paging configuration information being collisions between paging occasions for the SIM card to receive a paging message and paging occasions for other SIM card in the terminal to receive a paging message, page the SIM card at the paging occasions ⟿S902

FIG. 10

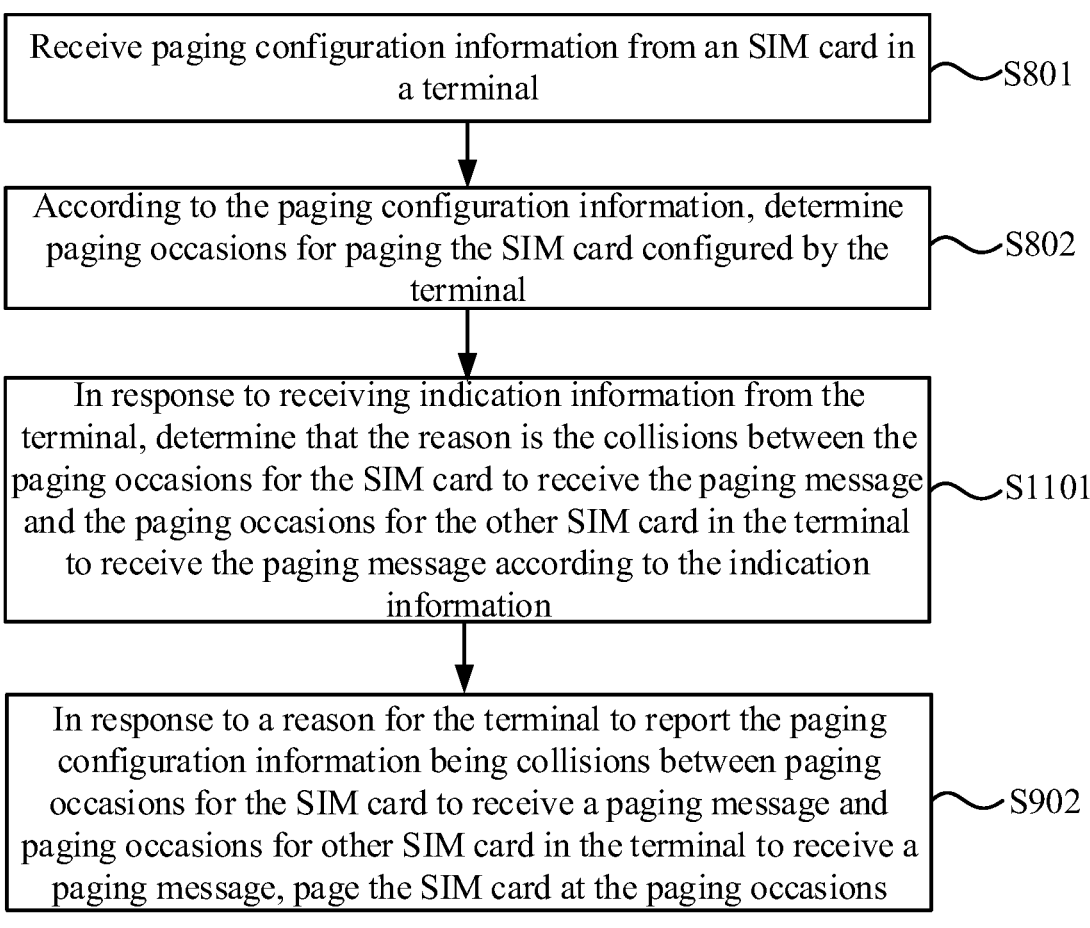

Receive paging configuration information from an SIM card in a terminal ~S801

According to the paging configuration information, determine paging occasions for paging the SIM card configured by the terminal ~S802

In response to receiving indication information from the terminal, determine that the reason is the collisions between the paging occasions for the SIM card to receive the paging message and the paging occasions for the other SIM card in the terminal to receive the paging message according to the indication information ~S1101

In response to a reason for the terminal to report the paging configuration information being collisions between paging occasions for the SIM card to receive a paging message and paging occasions for other SIM card in the terminal to receive a paging message, page the SIM card at the paging occasions ~S902

FIG. 11

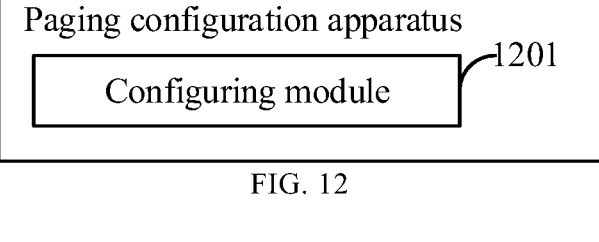

Paging configuration apparatus

Configuring module ~1201

FIG. 12

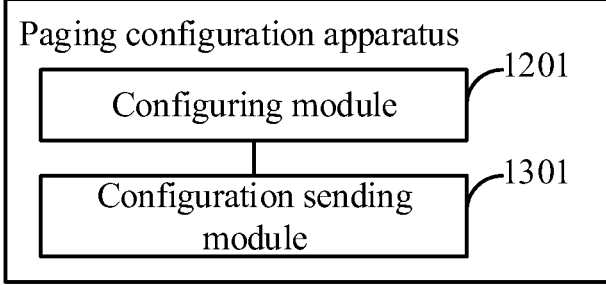

Paging configuration apparatus

Configuring module ~1201

Configuration sending module ~1301

FIG. 13

PAGING CONFIGURATION METHODS AND APPARATUSES, PAGING METHODS AND APPARATUSES

CROSS REFERENCE TO RELATED APPLICATIONS

The present application is a U.S. national phase of International Application No. PCT/CN2020/125403 filed on Oct. 30, 2020, the disclosure of which is hereby incorporated by reference in its entirety for all purposes.

BACKGROUND

In a multi-card terminal, the terminal can communicate through multiple SIM (Subscriber Identity Module) cards. For example, it can receive paging messages at paging occasions (PO) through the SIM cards. The paging occasions for different SIM cards to receive the paging messages may be the same. In this case, the paging occasions for different SIM cards to receive the paging messages will collide, affecting the reception of the paging messages by the SIM cards, for example, failing to receive the paging messages.

SUMMARY

The present disclosure relates to the field of communication technology, and in particular, to paging configuration methods, paging configuration apparatuses, paging methods, paging apparatuses, electronic devices, and computer-readable storage media.

According to a first aspect of the present disclosure, a paging configuration method is provided. The method is applied to a terminal, where at least a first SIM card and a second SIM card are arranged in the terminal, and includes: in response to predicting collisions between paging occasions for the first SIM card to receive a paging message and paging occasions for the second SIM card to receive a paging message, configuring the first SIM card to receive the paging message at first paging occasions of collided paging occasions, and/or configuring the second SIM card to receive the paging message at second paging occasions of the collided paging occasions.

According to a second aspect of the present disclosure, a paging method is provided. The method is applied to a network-side device, and includes: receiving paging configuration information sent from a SIM card in a terminal; according to the paging configuration information, determining paging occasions for paging the SIM card configured by the terminal; and paging the SIM card on the paging occasions.

According to a third aspect of the present disclosure, an electronic device is provided, including: a processor; and a memory for storing processor executable instructions, where the processor is configured to perform the paging configuration method and/or the paging method as described above.

According to a fourth aspect of the present disclosure, a computer-readable storage medium is provided, having a computer program stored thereon, where the program is executed by a processor to implement the steps in the paging configuration method and/or the steps in the paging method as described above.

According to the examples of the present disclosure, in a case where the terminal predicts the collisions between the paging occasions for the first SIM card to receive the paging message and the paging occasions for the second SIM card to receive the paging message, the first SIM card can be configured to receive the paging message at the first paging occasions of the collided paging occasions, and/or the second SIM card can be configured to receive the paging message at the second paging occasions of the collided paging occasions.

BRIEF DESCRIPTION OF THE DRAWINGS

In order to more clearly illustrate the technical solutions in the examples of the present disclosure, the accompanying drawings that need to be used in the description of the examples will be briefly introduced below. It is evident that the drawings in the following description are only some examples of the present disclosure. For those of ordinary skill in the art, other drawings may be obtained based on these drawings without creative efforts.

FIG. 1 is a schematic flowchart illustrating a paging configuration method according to an example of the present disclosure.

FIG. 2 is a schematic flowchart illustrating another paging configuration method according to an example of the present disclosure.

FIG. 3 is a schematic flowchart illustrating another paging configuration method according to an example of the present disclosure.

FIG. 4 is a schematic flowchart illustrating another paging configuration method according to an example of the present disclosure.

FIG. 5 is a schematic flowchart illustrating another paging configuration method according to an example of the present disclosure.

FIG. 6 is a schematic flowchart illustrating another paging configuration method according to an example of the present disclosure.

FIG. 7 is a schematic flowchart illustrating another paging configuration method according to an example of the present disclosure.

FIG. 8 is a schematic flowchart illustrating a paging method according to an example of the present disclosure.

FIG. 9 is a schematic flowchart illustrating another paging method according to an example of the present disclosure.

FIG. 10 is a schematic flowchart illustrating another paging method according to an example of the present disclosure.

FIG. 11 is a schematic flowchart illustrating another paging method according to an example of the present disclosure.

FIG. 12 is a schematic block diagram illustrating a paging configuration apparatus according to an example of the present disclosure.

FIG. 13 is a schematic block diagram illustrating another paging configuration apparatus according to an example of the present disclosure.

DETAILED DESCRIPTION OF THE EMBODIMENTS

Figure 14:
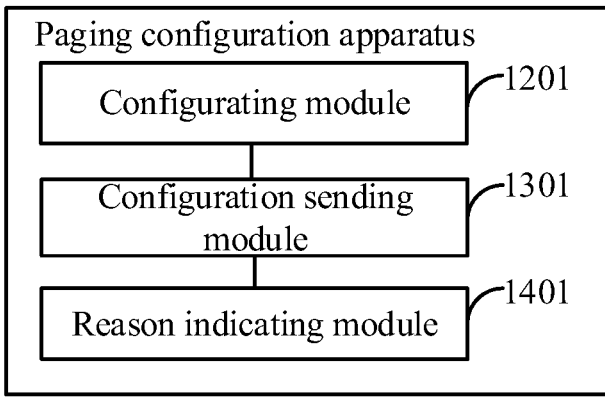
FIG. 14 is a schematic block diagram illustrating another paging configuration apparatus according to an example of the present disclosure.

In view of this, in the examples of the present disclosure, paging configuration methods, paging configuration apparatuses, paging methods, paging apparatuses, electronic devices, and computer-readable storage media are provided to solve the technical problems in the related art.

The technical solutions in the examples of the present disclosure will be clearly and completely described below with reference to the accompanying drawings in the examples of the present disclosure. Obviously, the described examples are only some, but not all, of the examples of the present disclosure. Based on the examples of the present disclosure, all other examples obtained by those of ordinary skill in the art without creative efforts fall within the protection scope of the present disclosure.

FIG. 1 is a schematic flowchart illustrating a paging configuration method according to an example of the present disclosure. The paging configuration method shown in this example may be applied to terminals. The terminals include, but are not limited to, electronic devices such as mobile phones, tablet computers, wearable devices, sensors, and Internet of Things devices. The terminals may be used as user devices to communicate with base stations. The base stations include, but are not limited to, 4G base stations, 5G base stations, and 6G base stations.

In an example, the base stations may be network side devices to which a paging method according to any one of the subsequent examples is applied, or in a case where network side devices are core networks, the base stations may communicate with the network side devices.

In an example, a plurality of SIM cards may be arranged in a terminal. It should be noted that the SIM cards may be common SIM cards, or ESIM cards, that is, embedded SIM cards. The plurality of SIM cards includes at least a first SIM card and a second SIM card. The first SIM card and the second SIM card may belong to the same operator network or different operator networks.

As shown in FIG. 1, the paging configuration method may include the following step(s).

At step S101, in response to predicting collisions between paging occasions for the first SIM card to receive a paging message and paging occasions for the second SIM card to receive a paging message, the first SIM card is configured to receive the paging message at first paging occasions of collided paging occasions, and/or the second SIM card is configured to receive the paging message at second paging occasions of the collided paging occasions.

In an example, after the first SIM card is registered to a core network, a user equipment identifier, for example, the UE ID of the first SIM card, may be received from the core network, and then paging occasions PO1 for the first SIM card to receive a paging message may be determined according to information such as the user equipment identifier.

In a case where paging occasions PO2 for the second SIM card to receive a paging message are known, although a paging message has not yet been received through the first SIM card, the paging occasions PO1 for the first SIM card to receive the paging message can be determined. Therefore, it can be predicted whether the paging occasions PO1 for the first SIM card to receive the paging message and the paging occasions PO2 for the second SIM card to receive the paging message collide. For example, it is determined whether the paging occasions PO1 and the paging occasions PO2 overlap in a time domain. The overlap may be a partial overlap or a complete overlap.

In a case where it is predicted that the paging occasions for the first SIM card to receive the paging message and the paging occasions for the second SIM card to receive the paging message collide, it can be determined that, at all or part of the paging occasions for the first SIM card to receive the paging message, the second SIM card will receive the paging message. Such paging occasions are called collided paging occasions. That is, at the collided paging occasions, both the first SIM card and the second SIM card will receive paging messages.

If, at the collided paging occasions, the paging messages are received through both the first SIM card and the second SIM card, due to being limited to factors such as hardware structure and performance of the terminal, the first SIM card or the second SIM card may be in a poor status of receiving the paging message.

According to the examples of the present disclosure, in a case where the terminal predicts the collisions between the paging occasions for the first SIM card to receive the paging message and the paging occasions for the second SIM card to receive the paging message, the first SIM card can be configured to receive the paging message at the first paging occasions of the collided paging occasions, and/or the second SIM card can be configured to receive the paging message at the second paging occasions of the collided paging occasions.

In an example, the first paging occasions and the second paging occasions may be completely different paging occasions. In this case, the first SIM card and the second SIM card can receive the paging messages at completely different paging occasions, so as to completely avoid collisions.

In an example, the first paging occasions and the second paging occasions may be partially different paging occasions. In this case, the first SIM card and the second SIM card can receive the paging messages at partially different paging occasions, so as to partially avoid collisions.

It should be noted that the first paging occasions and the second paging occasions may be periodic paging occasions. Although the first SIM card can receive the paging message at the first paging occasions and the second SIM card can receive the paging message at the second paging occasions, a network side device corresponding to the first SIM card may broadcast the paging message only at some of the first paging occasions and a network side device corresponding to the second SIM card may broadcast the paging message only at some of the second paging occasions.

For example, even if the first paging occasions and the second paging occasions are partially different paging occasions, to some extent, it may be completely avoided that the paging occasions for the first SIM card to receive the paging message and the paging occasions for the second SIM card to receive the paging message collide. For example, in the same time domain resource of the first paging occasions and the second paging occasions, neither a first network side device corresponding to the first SIM card nor a second network side device corresponding to the second SIM card broadcast the paging messages.

According to the examples of the present disclosure, the terminal can configure the first SIM card to receive the paging message at the first paging occasions of the collided paging occasions, and the second SIM card to receive the paging message at the second paging occasions of the collided paging occasions. On one hand, the problem of paging occasion collisions between the first SIM card and the second SIM card can be reduced or even avoided, so as to increase the probability of successfully receiving the paging messages. On the other hand, it can be controlled that the first SIM card and the second SIM card are not to receive the paging messages at all of the collided paging occasions, so as to reduce a number of the first SIM card and the second SIM card receiving the paging messages, which is beneficial to saving an amount of power of the terminal.

FIG. 2 is a schematic flowchart illustrating another paging configuration method according to an example of the present disclosure. As shown in FIG. 2, in response to predicting the collisions between the paging occasions for the first SIM card to receive the paging message and the paging occasions for the second SIM card to receive the paging message, configuring the first SIM card to receive the paging message at the first paging occasions of the collided paging occasions, and/or configuring the second SIM card to receive the paging message at the second paging occasions of the collided paging occasions.

At step S201, in response to predicting systematic collisions between the paging occasions for the first SIM card to receive the paging message and the paging occasions for the second SIM card to receive the paging message, configuring the first SIM card to receive the paging message at the first paging occasions of the collided paging occasions, and/or configuring the second SIM card to receive the paging message at the second paging occasions of the collided paging occasions.

In an example, in a case of predicting the collisions between the paging occasions for the first SIM card to receive the paging message and the paging occasions for the second SIM card to receive the paging message, it may be further determined whether their collisions are systematic collisions.

The paging occasions for the first SIM card to receive the paging message and the paging occasions for the second SIM card to receive the paging message may be periodic. The systematic collisions refer to collisions between all paging occasions for the first SIM card to receive the paging message and all paging occasions for the second SIM card to receive the paging message.

For example, within a preset time period after a current time, there are 10 paging occasions PO1 for the first SIM card to receive the paging message and 10 paging occasions PO2 for the second SIM card to receive the paging message, where all of the 10 paging occasions PO1 and the 10 paging occasions PO2 collide. For example, a first paging occasion PO1 and a first paging occasion PO2 collide, a second paging occasion PO1 and a second paging occasion PO2 collide . . . and a tenth paging occasion PO1 and a tenth paging occasion PO2 collide. Therefore, it can be determined that these collisions are systematic collisions.

When the collisions between the paging occasions are systematic collisions, each paging occasion for the first SIM card to receive the paging message and each paging occasion for the second SIM card to receive the paging message collide, which will seriously affect the reception of the paging messages by the first SIM card and the second SIM card. Therefore, in this case, the terminal can configure the first SIM card to receive the paging message at the first paging occasions of the collided paging occasions, and/or configure the second SIM card to receive the paging message at the second paging occasions of the collided paging occasions, so as to ensure an increased probability of successful reception of the paging messages.

FIG. 3 is a schematic flowchart illustrating another paging configuration method according to an example of the present disclosure. As shown in FIG. 3, in response to predicting the collisions between the paging occasions for the first SIM card to receive the paging message and the paging occasions for the second SIM card to receive the paging message, configuring the first SIM card to receive the paging message at the first paging occasions of the collided paging occasions, and/or configuring the second SIM card to receive the paging message at the second paging occasions of the collided paging occasions.

At step S301, in response to predicting the collisions between the paging occasions for the first SIM card to receive the paging message and the paging occasions for the second SIM card to receive the paging message, and that a number of the collisions is greater than a preset number, configuring the first SIM card to receive the paging message at the first paging occasions of the collided paging occasions, and/or configuring the second SIM card to receive the paging message at the second paging occasions of the collided paging occasions.

In an example, in a case of predicting the collisions between the paging occasions for the first SIM card to receive the paging message and the paging occasions for the second SIM card to receive the paging message, a number of the collisions that will occur may be further determined. Moreover, a number of the collisions that will occur within a preset time period may be determined.

For example, within a preset time period after a current time, there are 10 paging occasions PO1 for the first SIM card to receive the paging message and 10 paging occasions PO2 for the second SIM card to receive the paging message, and the preset number is 5, where 6 paging occasions PO1 and 6 paging occasions PO2 collide. Therefore, it can be determined that the number of the collisions is greater than the preset number.

When the number of the paging occasion collisions is greater than the preset number, the number of the collisions between the paging occasions for the first SIM card to receive the paging message and the paging occasions for the second SIM card to receive the paging message is larger, which will seriously affect the reception of the paging messages by the first SIM card and the second SIM card. Therefore, in this case, the terminal can configure the first SIM card to receive the paging message at the first paging occasions of the collided paging occasions, and/or configure the second SIM card to receive the paging message at the second paging occasions of the collided paging occasions, so as to ensure an increased probability of successful reception of the paging messages.

Figures 4, 5:
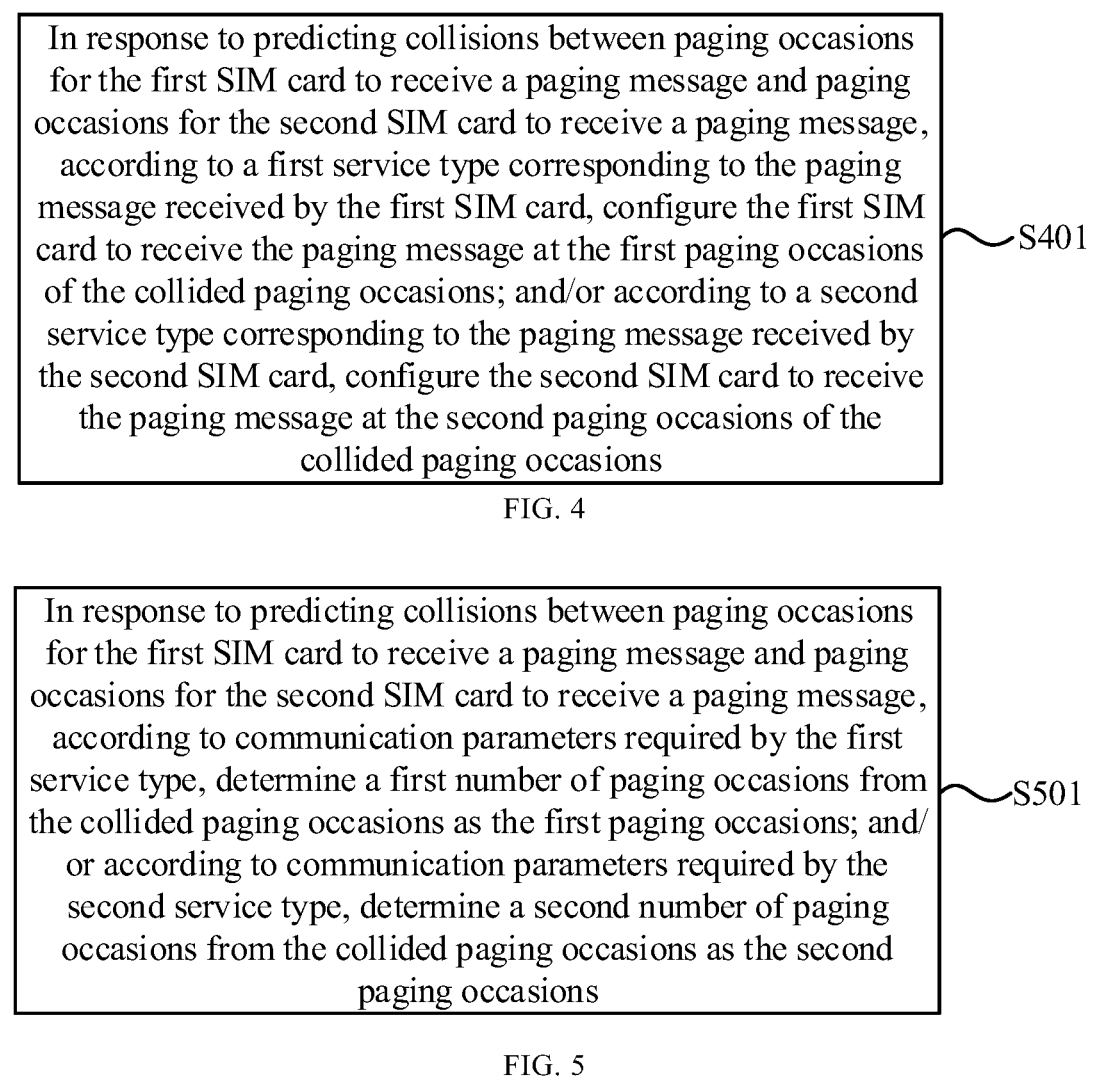

FIG. 4 is a schematic flowchart illustrating another paging configuration method according to an example of the present disclosure. As shown in FIG. 4, configuring the first SIM card to receive the paging message at the first paging occasions of the collided paging occasions includes the following step(S).

At step S401, according to a first service type corresponding to the paging message received by the first SIM card, configuring the first SIM card to receive the paging message at the first paging occasions of the collided paging occasions; and/or configuring the second SIM card to receive the paging message at the second paging occasions of the collided paging occasions includes: according to a second service type corresponding to the paging message received by the second SIM card, configuring the second SIM card to receive the paging message at the second paging occasions of the collided paging occasions.

In an example, the terminal may configure the first SIM card to receive the paging message at the first paging occasions of the collided paging occasions according to the first service type corresponding to the paging message received by the first SIM card, or configure the second SIM card to receive the paging message at the second paging occasions of the collided paging occasions according to the second service type corresponding to the paging message received by the second SIM card.

For example, for the first SIM card and the second SIM card, whether the terminal configures the paging occasions for the SIM cards to receive the paging messages and how to configure the paging occasions for the SIM cards to receive the paging messages may be determined based on the service types of the paging messages received by the SIM cards, so as to ensure that configuration results meet requirements of the service types corresponding to the paging messages received by the SIM cards.

For example, a priority may be set for each service type, and then it is determined whether the priority of the first service type is higher than a preset priority. If the priority of the first service type is higher than the preset priority, the first SIM card is configured to receive the paging message at the first paging occasions of the collided paging occasions. Correspondingly, it may be determined whether a priority of the second service type is higher than a preset priority. If the priority of the second service type is higher than the preset priority, the second SIM card is configured to receive the paging message at the second paging occasions of the collided paging occasions.

FIG. 5 is a schematic flowchart illustrating another paging configuration method according to an example of the present disclosure. As shown in FIG. 5, according to the first service type corresponding to the paging message received by the first SIM card, configuring the first SIM card to receive the paging message at the first paging occasions of the collided paging occasions includes the following step(s).

At step S501, according to communication parameters required by the first service type, determining a first number of paging occasions from the collided paging occasions as the first paging occasions; and/or according to the second service type corresponding to the paging message received by the second SIM card, configuring the second SIM card to receive the paging message at the second paging occasions of the collided paging occasions includes: according to the communication parameters required by the second service type, determining a second number of paging occasions from the collided paging occasions as the second paging occasions.

In an example, the terminal may specifically determine how to determine the first number of paging occasions from the collided paging occasions as the first paging occasions according to the communication parameters required by the first service type, or determine how to determine the second number of paging occasions from the collided paging occasions as the second paging occasions according to the communication parameters required by the second service type, so as to meet service requirements of the first service type and the second service type.

The communication parameters include, but are not limited to, latency, signal strength, packet loss rate, terminal movement status, etc., required by the service types.

For example, taking the communication parameters that include latency as an example, the latency required by the first service type may be determined. If the latency required by the first service type is lower than a preset latency, it is indicated that the first service type has a higher demand for real-time communication. Therefore, the determined first number of paging occasions may be relatively large. That is, a relatively large number of paging occasions are determined from the collided paging occasions as the first paging occasions, so as to quickly page the first SIM card to carry out corresponding services. If the latency required by the first service type is higher than the preset latency, it is indicated that the first service type has a lower demand for real-time communication. Therefore, the determined first number of paging occasions may be relatively small. That is, a relatively small number of paging occasions are determined from the collided paging occasions as the first paging occasions, so as to reduce collisions with the paging occasions for the second SIM card to receive the paging message.

For example, taking the communication parameters that include terminal movement status as an example, the movement status includes, but is not limited to, terminal movement speed, acceleration, position, etc. For example, taking the communication parameters that specifically include terminal movement speed as an example, if the movement speed is lower than a preset speed, it may be determined that the terminal is basically not moving, and its state of receiving signals is relatively stable. Therefore, the determined first number of paging occasions may be relatively small. That is, a relatively small number of paging occasions are determined from the collided paging occasions as the first paging occasions, so as to reduce collisions with the paging occasions for the second SIM card to receive the paging message. Correspondingly, if the movement speed is higher than the preset speed, it may be determined that the terminal is moving faster, and its state of receiving signals is relatively unstable. Therefore, the determined first number of paging occasions may be relatively large. That is, a relatively large number of paging occasions are determined from the collided paging occasions as the first paging occasions, so as to enable the terminal to receive the paging messages to carry out corresponding services.

The above examples are examples implemented for the first SIM card and are also applicable to the second SIM card.

FIG. 6 is a schematic flowchart illustrating another paging configuration method according to an example of the present disclosure. As shown in FIG. 6, the method further includes the following step(s).

At step S601, in response to configuring the first SIM card to receive the paging message at the first paging occasions of the collided paging occasions, sending first paging configuration information to a corresponding first network side device through the first SIM card, where the first paging configuration information indicates that the first network side device pages the first SIM card at the first paging occasions; and/or in response to configuring the second SIM card to receive the paging message at the second paging occasions of the collided paging occasions, sending second paging configuration information to a corresponding second network side device through the second SIM card, where the second paging configuration information indicates that the second network side device pages the second SIM card at the second paging occasions.

In an example, in a case of configuring the first SIM card to receive the paging message at the first paging occasions of the collided paging occasions, further, the first paging configuration information may be sent to the corresponding first network side device through the first SIM card, so as to use the first paging configuration information to indicate that the first network side device pages the first SIM card at the first paging occasions. The first network-side device may be a base station and/or a core network of a network where the first SIM card is located.

Based on this, the first network side device may select to broadcast the paging message to the first SIM card at the first paging occasions, but may be not to broadcast the paging message to the first SIM card at all of the collided paging occasions, which is beneficial to reducing the power consumption of the first network side device.

Correspondingly, in a case of configuring the second SIM card to receive the paging message at the second paging occasions of the collided paging occasions, further, the second paging configuration information may be sent to the corresponding second network side device through the second SIM card, so as to use the second paging configuration information to indicate that the second network side device pages the second SIM card at the second paging occasions. The second network side device may be a base station and/or a core network of a network where the second SIM card is located.

Based on this, the second network side device may select to broadcast the paging message to the second SIM card at the second paging occasions, but may be not to broadcast the paging message to the second SIM card at all of the collided paging occasions, which is beneficial to reducing the power consumption of the second network side device.

FIG. 7 is a schematic flowchart illustrating another paging configuration method according to an example of the present disclosure. As shown in FIG. 7, the method further includes the following step(s).

At step S701, explicitly and/or implicitly indicating to the first network side device through the first SIM card that a reason for reporting the first paging configuration information is collisions of paging occasions is; and/or explicitly and/or implicitly indicating to the second network side device through the second SIM card that a reason for reporting the second paging configuration information is collisions of paging occasions.

In an example, after the terminal sends the first paging configuration information to the first network side device, in order to enable the first network side device to determine that the reason for reporting the first paging configuration information is the collisions of paging occasions, an indication may be given to the first network side device. An indication manner may be an explicit indication manner or an implicit indication manner.

The explicit indication manner may be that, in addition to the first paging configuration information, the terminal additionally sends indication information to indicate to the first network side device. The implicit indication manner may be that the terminal and the first network side device have agreed in advance (for example, in a communication protocol) on the fact that, the first network side device, when receiving the first paging configuration information, tacitly approves the reason for reporting the first paging configuration information is the collisions of paging occasions, without additionally sending the indication information.

Similarly, after the terminal sends the second paging configuration information to the second network side device, in order to enable the second network side device to determine that the reason for reporting the second paging configuration information is the collisions of paging occasions, an indication may be given to the second network side device. An indication manner may be an explicit indication manner or an implicit indication manner.

The explicit indication manner may be that, in addition to the second paging configuration information, the terminal additionally sends indication information to indicate to the second network side device. The implicit indication manner may be that the terminal and the second network side device have agreed in advance (for example, in a communication protocol) on the fact that, the second network side device, when receiving the second paging configuration information, tacitly approves the reason for reporting the second paging configuration information is the collisions of paging occasions, without additionally sending the indication information.

It should be noted that, by enabling the network side devices to learn about the reason for the terminal to report the paging configuration information, the network side devices may further determine whether the paging configuration information is used. For example, when the reason is the collisions of paging occasions, the network side devices page corresponding SIM cards according to paging occasions in the paging configuration information, and when the reason is not the collisions of paging occasions, for example, the reason may be that the terminal reports user equipment auxiliary information (i.e., the paging occasions in the paging configuration information are reported as the user equipment auxiliary information), the network side devices are not to page the corresponding SIM cards according to the paging occasions in the paging configuration information.

FIG. 8 is a schematic flowchart illustrating a paging method according to an example of the present disclosure. The paging method shown in this example may be applied to network-side devices. The network side devices may be base stations or core networks. The base stations include, but are not limited to, 4G base stations, 5G base stations, and 6G base stations. The network side devices may communicate with terminals serving as user equipment. The terminals include, but are not limited to, electronic devices such as mobile phones, tablet computers, wearable devices, sensors, and Internet of Things devices. In an example, the terminals may be terminals to which the paging configuration method according to any one of the above examples is applied.

In an example, a plurality of SIM cards may be arranged in a terminal. It should be noted that the SIM cards may be common SIM cards or ESIM cards, that is, embedded SIM cards. The plurality of SIM cards includes at least a first SIM card and a second SIM card. The first SIM card and the second SIM card may belong to the same operator network or different operator networks.

As shown in FIG. 8, the paging method may include the following steps S801 to S803.

At step S801, paging configuration information from a SIM card in a terminal is received.

At step S802, according to the paging configuration information, paging occasions for paging the SIM card configured by the terminal are determined.

At step S803, the SIM card is paged on the paging occasions.

In an example, in a case where the SIM card is the first SIM card in the above examples, the network side device may be the first network side device in the above examples; in a case where the SIM card is the second SIM card in the above examples, the network side device may be the second network side device in the above examples.

In an example, in a case where the terminal predicts collisions between paging occasions for the SIM card (for example, the first SIM card) to receive a paging message and paging occasions for other SIM card (for example, the second SIM card) in the terminal to receive a paging message, the SIM card may be configured to receive the paging message at paging occasions of collided paging occasions.

Furthermore, the paging configuration information may be sent to the network side device, so as to use the paging configuration information to indicate that the network side device pages the SIM card at the paging occasions. The network side device may be a base station and/or a core network of a network where the SIM card is located.

Based on this, the network side device may select to broadcast the paging message to the SIM card at the paging occasions configured in the paging configuration information, but may be not to broadcast the paging message to the SIM card at all of the collided paging occasions, which is beneficial to reducing the power consumption of the network side device.

FIG. 9 is a schematic flowchart illustrating another paging method according to an example of the present disclosure. As shown in FIG. 9, paging the SIM card at the paging occasions includes the following step(s).

At step S901, in response to a reason for the terminal to report the paging configuration information being collisions between paging occasions for the SIM card to receive a paging message and paging occasions for other SIM cards in the terminal to receive a paging message, paging the SIM card at the paging occasions.

In an example, the terminal may send the reason for reporting the paging configuration information to the network side device. For example, the reason for reporting the paging configuration information includes, but is not limited to, the collisions between the paging occasions for the SIM card to receive the paging message and the paging occasions for the other SIM card in the terminal to receive the paging message, the terminal reporting user equipment auxiliary information, etc.

When the reason for reporting the paging configuration information is the collisions between the paging occasions for the SIM card to receive the paging message and the paging occasions for the other SIM card in the terminal to receive the paging message, the network side device may page the SIM card at the paging occasions, so as to implement targeted configuration operations.

FIG. 10 is a schematic flowchart illustrating another paging method according to an example of the present disclosure. As shown in FIG. 10, the method further includes the following step(s).

At step S1001, in response to receiving the paging configuration information, determine that the reason is the collisions between the paging occasions for the SIM card to receive the paging message and the paging occasions for the other SIM card in the terminal to receive the paging message.

FIG. 11 is a schematic flowchart illustrating another paging method according to an example of the present disclosure. As shown in FIG. 11, the method further includes the following step(s).

At step S1101, in response to receiving indication information from the terminal, determine that the reason is the collisions between the paging occasions for the SIM card to receive the paging message and the paging occasions for the other SIM card in the terminal to receive the paging message according to the indication information.

In an example, after the terminal sends the paging configuration information to the network side device, in order to enable the network side device to determine that the reason for reporting the paging configuration information is the collisions of paging occasions, indication may be given to the network side device. An indication manner may be an explicit indication manner or an implicit indication manner.

The explicit indication manner may be that, in addition to the paging configuration information, the terminal additionally sends indication information to indicate to the network side device. The implicit indication manner may be that the terminal and the network side device have agreed in advance (for example, in a communication protocol) on the fact that the network side device, when receiving the paging configuration information, tacitly approves the reason for reporting the paging configuration information is the collisions of paging occasions, without additionally sending the indication information.

Corresponding to the paging configuration method and paging method examples, the present disclosure further provides paging configuration apparatus and paging apparatus examples.

FIG. 12 is a schematic block diagram illustrating a paging configuration apparatus according to an example of the present disclosure. The paging configuration apparatus shown in this example may be applied to terminals. The terminals include, but are not limited to, electronic devices such as mobile phones, tablet computers, wearable devices, sensors, and Internet of Things devices. The terminals may be used as user devices to communicate with base stations. The base stations include, but are not limited to, 4G base stations, 5G base stations, and 6G base stations.

In an example, the base stations may be network side devices to which a paging apparatus according to any one of the subsequent examples is applied, or in a case where the network side devices are core networks, the base stations may communicate with the network side devices.

In an example, a plurality of SIM cards may be arranged in a terminal. It should be noted that the SIM cards may be common SIM cards or ESIM cards, that is, embedded SIM cards. The plurality of SIM cards includes at least a first SIM card and a second SIM card. The first SIM card and the second SIM card may belong to the same operator network or different operator networks.

As shown in FIG. 12, the paging configuration apparatus may include: a configuring module 1201, configured to, in response to predicting collisions between paging occasions for the first SIM card to receive a paging message and paging occasions for the second SIM card to receive a paging message, configure the first SIM card to receive the paging message at first paging occasions of collided paging occasions, and/or configure the second SIM card to receive the paging message at second paging occasions of the collided paging occasions.

In some examples, predicting the collisions between the paging occasions for the first SIM card to receive the paging message and the paging occasions for the second SIM card to receive the paging message includes: predicting systematic collisions between the paging occasions for the first SIM card to receive the paging message and the paging occasions for the second SIM card to receive the paging message.

In some examples, predicting the collisions between the paging occasions for the first SIM card to receive the paging message and the paging occasions for the second SIM card to receive the paging message includes: predicting the collisions between the paging occasions for the first SIM card to receive the paging message and the paging occasions for the second SIM card to receive the paging message, and a number of the collisions is greater than a preset number.

In some examples, the configuring module is configured to, according to a first service type corresponding to the paging message received by the first SIM card, configure the first SIM card to receive the paging message at the first paging occasions of the collided paging occasions; and/or according to a second service type corresponding to the paging message received by the second SIM card, configure the second SIM card to receive the paging message at the second paging occasions of the collided paging occasions.

In some examples, the configuring module is configured to, according to communication parameters required by the first service type, determine a first number of paging occasions from the collided paging occasions as the first paging occasions; and/or according to the communication parameters required by the second service type, determine a second number of paging occasions from the collided paging occasions as the second paging occasions.

FIG. 13 is a schematic block diagram illustrating another paging configuration apparatus according to an example of the present disclosure. As shown in FIG. 13, the apparatus further includes: a configuration sending module 1301, configured to, in response to configuring the first SIM card to receive the paging message at the first paging occasions of the collided paging occasions, send the first paging configuration information to a corresponding first network side device through the first SIM card, where the first paging configuration information indicates that the first network side device pages the first SIM card at the first paging occasions; and/or in response to configuring the second SIM card to receive the paging message at the second paging occasions of the collided paging occasions, send second paging configuration information to a corresponding second network side device through the second SIM card, where the second paging configuration information indicates that the second network side device pages the second SIM card at the second paging occasions.

FIG. 14 is a schematic block diagram illustrating another paging configuration apparatus according to an example of the present disclosure. As shown in FIG. 14, the apparatus further includes: a reason indicating module 1401, configured to explicitly and/or implicitly indicate, to the first network side device through the first SIM card, a reason for reporting the first paging configuration information is collisions of paging occasions; and/or explicitly and/or implicitly indicate, to the second network side device through the second SIM card, a reason for reporting the second paging configuration information is collisions of paging occasions.

Figure 15:
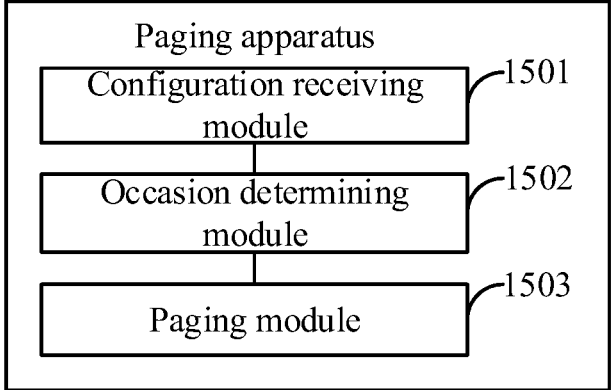
FIG. 15 is a schematic block diagram illustrating a paging apparatus according to an example of the present disclosure.

FIG. 15 is a schematic block diagram illustrating a paging apparatus according to an example of the present disclosure. The paging apparatus shown in this example may be applied to network-side devices. The network side devices may be base stations or core networks. The base stations include, but are not limited to, 4G base stations, 5G base stations, and 6G base stations. The network side devices may communicate with terminals serving as user equipment. The terminals include, but are not limited to, electronic devices such as mobile phones, tablet computers, wearable devices, sensors, and Internet of Things devices. In an example, the terminals may be terminals to which the paging configuration apparatus according to any one of the above examples is applied.

In an example, a plurality of SIM cards may be arranged in a terminal. It should be noted that the SIM cards may be common SIM cards or ESIM cards, that is, embedded SIM cards. The plurality of SIM cards includes at least a first SIM card and a second SIM card. The first SIM card and the second SIM card may belong to the same operator network or different operator networks.

As shown in FIG. 15, the paging apparatus may include a configuration receiving module 1501, an occasion determining module 1502, and a paging module 1503.

The configuration receiving module 1501 is configured to receive paging configuration information from a SIM card in a terminal The occasion determining module 1502 is configured to determine, according to the paging configuration information, paging occasions for paging the SIM card configured by the terminal.

The paging module 1503 is configured to page the SIM card at the paging occasions.

In some examples, the paging module is configured to, in response to a reason for the terminal to report the paging configuration information being collisions between paging occasions for the SIM card to receive a paging message and paging occasions for other SIM cards in the terminal to receive a paging message, page the SIM card at the paging occasions.

Figure 16:
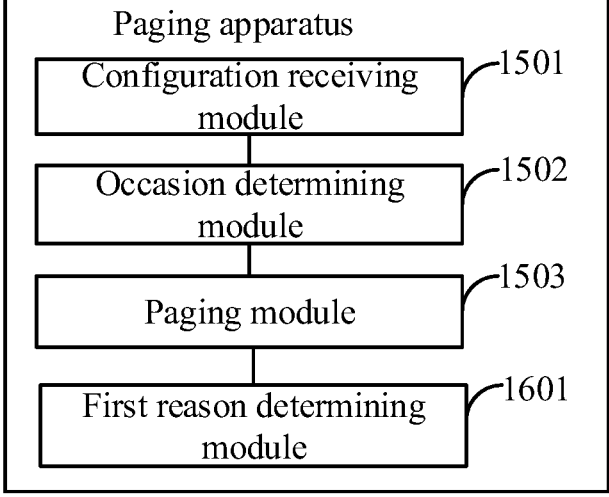
FIG. 16 is a schematic block diagram illustrating another paging apparatus according to an example of the present disclosure.

FIG. 16 is a schematic block diagram illustrating another paging apparatus according to an example of the present disclosure. As shown in FIG. 16, the apparatus further includes: a first reason determining module 1601, configured to, in response to receiving the paging configuration information, determine the reason is the collisions between the paging occasions for the SIM card to receive the paging message and the paging occasions for the other SIM card in the terminal to receive the paging message.

Figure 17:
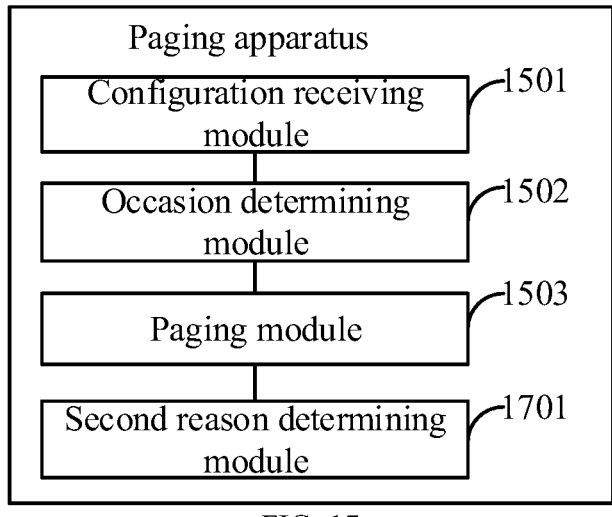
FIG. 17 is a schematic block diagram illustrating another paging apparatus according to an example of the present disclosure.

FIG. 17 is a schematic block diagram illustrating another paging apparatus according to an example of the present disclosure. As shown in FIG. 17, the apparatus further includes: a second reason determining module 1701, configured to, in response to receiving indication information from the terminal, determine, according to the indication information, the reason is the collisions between the paging occasions for the SIM card to receive the paging message and the paging occasions for the other SIM card in the terminal to receive the paging message.

Regarding the apparatuses in the included examples, specific manners in which each module performs operations have been described in detail in relevant method examples, and will not be elaborated here.

For the apparatus examples, since they basically correspond to the method examples, reference may be made to the partial description of the method examples. The apparatus examples described above are merely illustrative, where the modules described as separate components may or may not be physically separated, and the components displayed as modules may or may not be physical modules, i.e., may be located in one place or may be distributed to multiple network modules. Some or all of the modules may be selected according to actual needs to achieve the objectives of the present disclosure. Those of ordinary skill in the art can understand and implement the present disclosure without any creative effort.

In the examples of the present disclosure, an electronic device is provided, including: a processor; and a memory for storing processor executable instructions, where the processor is configured to perform the paging configuration method according to any one of the examples and/or the paging method according to any one of the examples.

In the examples of the present disclosure, a non-transitory computer-readable storage medium is provided, having a computer program stored thereon, where the program is executed by a processor to implement the steps in the paging configuration method according to any one of the above examples and/or the steps in the paging method according to any one of the above examples.

Figure 18:
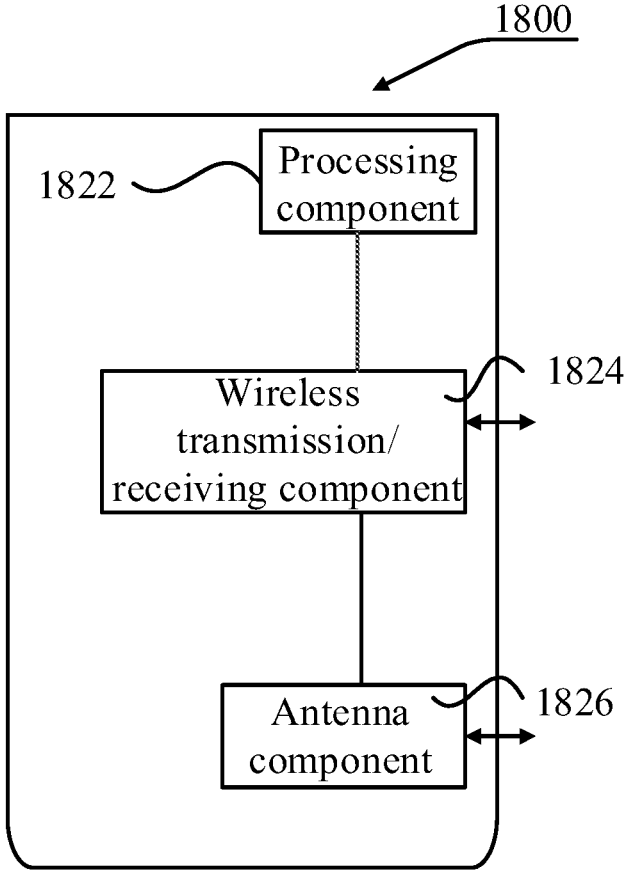
FIG. 18 is a schematic block diagram illustrating an apparatus for paging according to an example of the present disclosure.

FIG. 18 is a schematic block diagram illustrating an apparatus 1800 for paging according to an example of the present disclosure. The apparatus 1800 may be provided to a base station. Referring to FIG. 18, the apparatus 1800 includes a processing component 1822, a wireless transmission/receiving component 1824, an antenna component 1826, and a signal processing portion specific to a wireless interface. The processing component 1822 may further include one or more processors. One of the processors in the processing component 1822 may be configured to implement the paging method according to any one of the examples.

Figure 19:
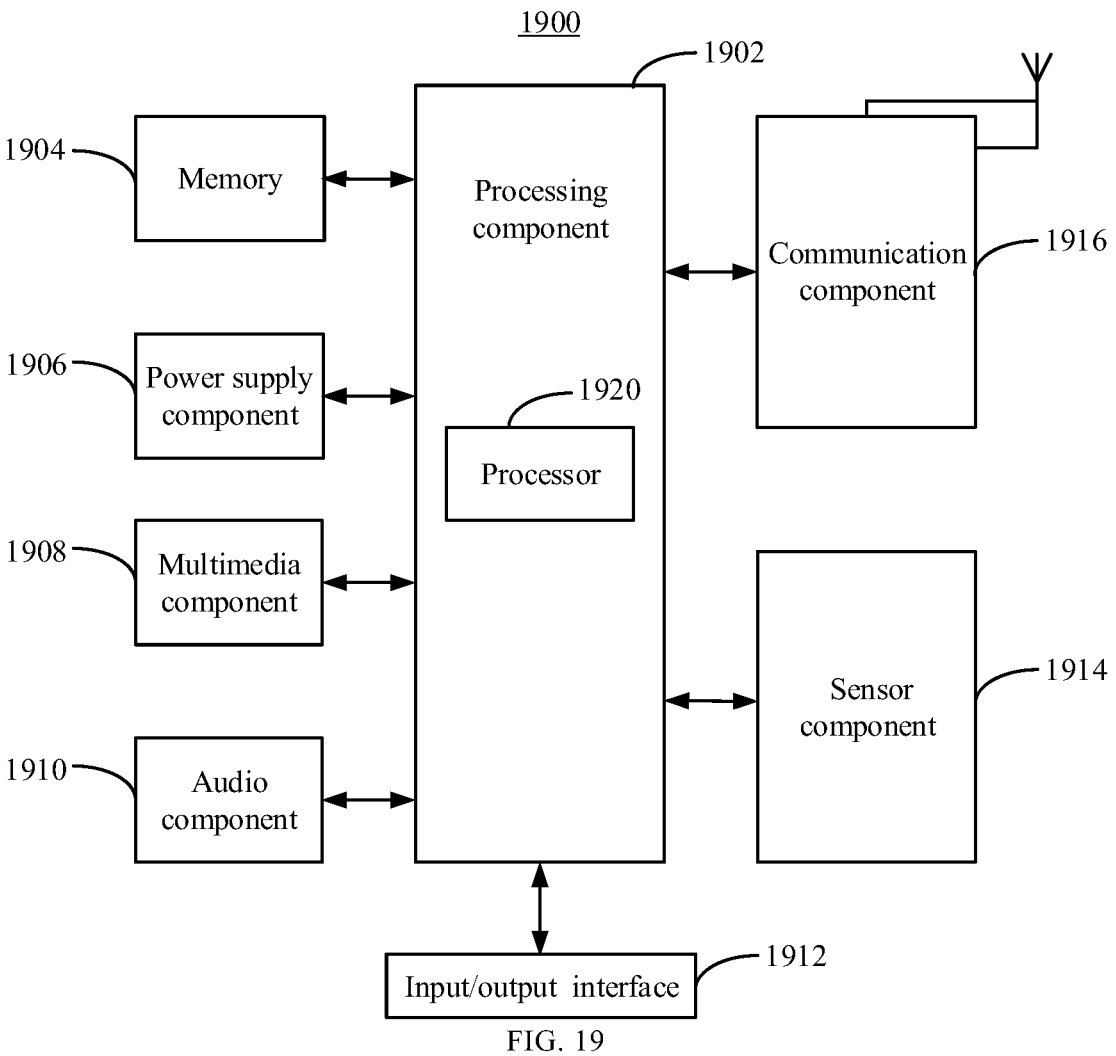
FIG. 19 is a schematic block diagram illustrating an apparatus for paging configuration according to an example of the present disclosure.

FIG. 19 is a schematic block diagram illustrating an apparatus 1900 for paging configuration according to an example of the present disclosure. For example, the apparatus 1900 may be a mobile phone, a computer, a digital broadcast terminal, a messaging device, a game console, a tablet device, a medical equipment, a fitness equipment, a personal digital assistant, etc.

Referring to FIG. 19, the apparatus 1900 may include one or more of the following components: a processing component 1902, a memory 1904, a power supply component 1906, a multimedia component 1908, an audio component 1910, an input/output (I/O) interface 1912, a sensor component 1914, and a communication component 1916.

The processing component 1902 usually controls the overall operation of the apparatus 1900, such as operations associated with display, telephone calls, data communications, camera operations, and recording operations. The processing component 1902 may include one or more processors 1920 to execute instructions to perform all or part of the steps in the paging configuration methods described above. Moreover, the processing component 1902 may include one or more modules to facilitate interaction between the processing component 1902 and other components. For example, the processing component 1902 may include a multimedia module to facilitate interaction between the multimedia component 1908 and the processing component 1902.

The memory 1904 is configured to store various types of data to support operation at the apparatus 1900. Examples of these data include instructions for any application or method operating at the apparatus 1900, contact data, phone book data, messages, pictures, videos, and the like. The memory 1904 may be implemented by any type of volatile or non-volatile storage device or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or an optical disk.

The power supply component 1906 provides power to various components of the apparatus 1900. The power supply component 1906 may include a power management system, one or more power sources, and other components associated with power generated, managed, and distributed for the apparatus 1900.

The multimedia component 1908 includes a screen that provides an output interface between the apparatus 1900 and a user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of touch or slide actions but also detect the duration and pressure associated with touch or slide operations. In some examples, the multimedia component 1908 includes a front camera and/or a rear camera. When the apparatus 1900 is in an operation mode, such as a shooting mode or a video mode, the front camera and/or the rear camera may receive external multimedia data. Each of the front and rear cameras may be a fixed optical lens system or have a focal length and an optical zoom capability.

The audio component 1910 is configured to output and/or input audio signals. For example, the audio component 1910 includes a microphone (MIC) configured to receive an external audio signal when the apparatus 1900 is in an operation mode, such as a call mode, a recording mode, and a voice recognition mode. The received audio signal may be further stored in the memory 1904 or transmitted via the communication component 1916. In some examples, the audio component 1910 also includes a loudspeaker for outputting an audio signal.

The I/O interface 1912 provides an interface between the processing component 1902 and a peripheral interface module, which may be a keyboard, a click wheel, a button, or the like. These buttons may include, but are not limited to, a home button, a volume button, a start button, and a lock button.

The sensor component 1914 includes one or more sensors for providing a status assessment in various aspects of the apparatus 1900. For example, the sensor component 1914 may detect an open/closed state of the apparatus 1900, and the relative positioning of components, for example, the component is a display and a keypad of the apparatus 1900. The sensor component 1914 may also detect a change in position of the apparatus 1900 or a component of the apparatus 1900, the presence or absence of a user in contact with the apparatus 1900, the orientation or acceleration/deceleration of the apparatus 1900, and a change in temperature of the apparatus 1900. The sensor component 1914 may include a proximity sensor configured to detect the presence of nearby objects without any physical contact. The sensor component 1914 may also include a light sensor, such as a CMOS or CCD image sensor, for use in imaging applications. In some examples, the sensor component 1914 may also include an acceleration sensor, a gyro sensor, a magnetic sensor, a pressure sensor, or a temperature sensor.

The communication component 1916 is configured to facilitate wired or wireless communication between the apparatus 1900 and other devices. The apparatus 1900 may access a wireless network based on a communication standard, such as WiFi, 2G or 3G, 4G LTE, 5G NR, or a combination thereof. In an example, the communication component 1916 receives broadcast signals or broadcast-associated information from an external broadcast management system via a broadcast channel. In an example, the communication component 1916 also includes a near field communication (NFC) module to facilitate short-range communication. For example, the NFC module may be implemented based on a radio frequency identification (RFID) technology, an infrared data association (IrDA) technology, an ultra wide band (UWB) technology, a Bluetooth (BT) technology, and other technologies.

In an example, the apparatus 1900 may be implemented by one or more application specific integrated circuits (ASICs), digital signal processors (DSPs), digital signal processing devices (DSPDs), programmable logic devices (PLDs), a field programmable gate array (FPGA), a controller, a microcontroller, a microprocessor or other electronic elements for performing the paging configuration methods.

In an example, there is also provided a non-transitory computer-readable storage medium including instructions, such as a memory 1904 including instructions, where the instructions are executable by the processor 1920 of the apparatus 1900 to perform the paging configuration methods. For example, the non-transitory computer-readable storage medium may be a ROM, a random access memory (RAM), a CD-ROM, a magnetic tape, a floppy disk, or an optical data storage device.

The terminal can configure the first SIM card to receive the paging message at the first paging occasions of the collided paging occasions, and the second SIM card to receive the paging message at the second paging occasions of the collided paging occasions. On one hand, the problem of paging occasion collisions between the first SIM card and the second SIM card can be reduced or even avoided, so as to increase the probability of successfully receiving the paging messages. On the other hand, it can be controlled that the first SIM card and the second SIM card do not to receive the paging messages at all of the collided paging occasions, so as to reduce a number of the first SIM card and the second SIM card receiving the paging messages, which is beneficial to saving an amount of power of the terminal.

Other embodiments of the present disclosure will be readily apparent to those skilled in the art after considering the specification and practicing the contents disclosed herein. The present disclosure is intended to cover any variations, uses, or adaptations of the present disclosure, which follow the general principle of the present disclosure and include common knowledge or conventional technical means in the art that are not disclosed in the present disclosure. The specification and examples are to be regarded as illustrative only. The true scope and spirit of the present disclosure are pointed out by the following claims.

It is to be understood that the present disclosure is not limited to the precise structures that have been described and shown in the drawings, and various modifications and changes can be made without departing from the scope thereof. The scope of the disclosure is to be limited only by the appended claims.

It shall be noted that the relational terms such as "first" and "second" used herein are merely intended to distinguish one entity or operation from another entity or operation rather than to require or imply any such actual relation or order existing between these entities or operations. Also, the term "including," "containing," or any variation thereof is intended to encompass non-exclusive inclusion, so that a process, method, article, or device including a series of elements includes not only those elements but also other elements not listed explicitly or those elements inherent to such a process, method, article, or device. Without more limitations, an element defined by the statement "including a . . . " shall not be precluded to include additional same elements present in a process, method, article, or device that includes the elements.

The methods and apparatuses provided in the examples of the present disclosure have been introduced in detail above. Specific examples are used herein to illustrate the principle and implementation manners of the present disclosure. The above description of the examples is used only to help understand the methods and their core ideas of the present disclosure. At the same time, for those skilled in the art, according to the ideas of the present disclosure, there will be changes in the specific implementation and application scope. In conclusion, the contents of the specification should not be construed as a limitation to the present disclosure.

The invention claimed is:

1. A paging configuration method, performed by a terminal, wherein at least a first SIM card and a second SIM card are arranged in the terminal, and comprising:
in response to predicting collisions between paging occasions for the first SIM card to receive a paging message and paging occasions for the second SIM card to receive a paging message, configuring the first SIM card to receive the paging message at first paging occasions of collided paging occasions according to a first service type corresponding to the paging message received by the first SIM card, and/or configuring the second SIM card to receive the paging message at second paging occasions of the collided paging occasions according to a second service type corresponding to the paging message received by the second SIM card.

2. The method of claim 1, wherein predicting the collisions between the paging occasions for the first SIM card to receive the paging message and the paging occasions for the second SIM card to receive the paging message comprises:
predicting systematic collisions between the paging occasions for the first SIM card to receive the paging message and the paging occasions for the second SIM card to receive the paging message.

3. The method of claim 1, wherein predicting the collisions between the paging occasions for the first SIM card to receive the paging message and the paging occasions for the second SIM card to receive the paging message comprises:
predicting the collisions between the paging occasions for the first SIM card to receive the paging message and the paging occasions for the second SIM card to receive the paging message, and a number of the collisions is greater than a preset number.

4. The method of claim 1, wherein according to the first service type corresponding to the paging message received by the first SIM card, configuring the first SIM card to receive the paging message at the first paging occasions of the collided paging occasions comprises:
according to communication parameters required by the first service type, determining a first number of paging occasions from the collided paging occasions as the first paging occasions; and/or
according to the second service type corresponding to the paging message received by the second SIM card, configuring the second SIM card to receive the paging message at the second paging occasions of the collided paging occasions comprises:
according to communication parameters required by the second service type, determining a second number of paging occasions from the collided paging occasions as the second paging occasions.

5. The method of claim 1, further comprising:
in response to configuring the first SIM card to receive the paging message at the first paging occasions of the collided paging occasions, sending first paging configuration information to a corresponding first network side device through the first SIM card, wherein the first paging configuration information indicates that the corresponding first network side device pages the first SIM card at the first paging occasions; and/or
in response to configuring the second SIM card to receive the paging message at the second paging occasions of the collided paging occasions, sending second paging configuration information to a corresponding second network side device through the second SIM card, wherein the second paging configuration information indicates that the corresponding second network side device pages the second SIM card at the second paging occasions.

6. The method of claim 5, further comprising:

explicitly and/or implicitly indicating, to the corresponding first network side device through the first SIM card, a reason for reporting the first paging configuration information is collisions of paging occasions; and/or explicitly and/or implicitly indicating, to the corresponding second network side device through the second SIM card, a reason for reporting the second paging configuration information is collisions of paging occasions.

7. A paging method, performed by a network side device, and comprising:

receiving paging configuration information sent by a SIM card in a terminal according to the method of claim 5;

according to the paging configuration information, determining paging occasions for paging the SIM card configured by the terminal; and paging the SIM card at the paging occasions.

8. The method of claim 7, wherein paging the SIM card at the paging occasions comprises:

in response to a reason for the terminal to report the paging configuration information being collisions between paging occasions for the SIM card to receive a paging message and paging occasions for other SIM card in the terminal to receive a paging message, paging the SIM card at the paging occasions.

9. The method of claim 8, further comprising:

in response to receiving the paging configuration information, determining the reason is the collisions between the paging occasions for the SIM card to receive the paging message and the paging occasions for the other SIM card in the terminal to receive the paging message.

10. The method of claim 8, further comprising:

in response to receiving indication information from the terminal, determining, according to the indication information, the reason is the collisions between the paging occasions for the SIM card to receive the paging message and the paging occasions for the other SIM card in the terminal to receive the paging message.

11. An electronic device, comprising:

a processor; and a memory for storing processor executable instructions, wherein the processor is configured to perform the paging method of claim 7.

12. A non-transitory computer readable storage medium having a computer program stored thereon, wherein the computer program when executed by a processor causes the processor to perform the paging configuration method of claim 1.

13. An electronic device, comprising:

a processor; and a memory for storing processor executable instructions, wherein the processor is configured to:

in response to predicting collisions between paging occasions for a first SIM card to receive a paging message and paging occasions for a second SIM card to receive a paging message, configure the first SIM card to receive the paging message at first paging occasions of collided paging occasions according to a first service type corresponding to the paging message received by the first SIM card, and/or configure the second SIM card to receive the paging message at second paging occasions of the collided paging occasions according to a second service type corresponding to the paging message received by the second SIM card.

14. The electronic device of claim 13, wherein predicting the collisions between the paging occasions for the first SIM card to receive the paging message and the paging occasions for the second SIM card to receive the paging message comprises:

predicting systematic collisions between the paging occasions for the first SIM card to receive the paging message and the paging occasions for the second SIM card to receive the paging message.

15. The electronic device of claim 13, wherein predicting the collisions between the paging occasions for the first SIM card to receive the paging message and the paging occasions for the second SIM card to receive the paging message comprises:

predicting the collisions between the paging occasions for the first SIM card to receive the paging message and the paging occasions for the second SIM card to receive the paging message, and a number of the collisions is greater than a preset number.

16. The electronic device of claim 13, wherein when according to the first service type corresponding to the paging message received by the first SIM card, configuring the first SIM card to receive the paging message at the first paging occasions of the collided paging occasions, the processor is configured to:

according to communication parameters required by the first service type, determine a first number of paging occasions from the collided paging occasions as the first paging occasions; and/or when according to the second service type corresponding to the paging message received by the second SIM card, configuring the second SIM card to receive the paging message at the second paging occasions of the collided paging occasions, the processor is configured to:

according to communication parameters required by the second service type, determine a second number of paging occasions from the collided paging occasions as the second paging occasions.

17. The electronic device of claim 13, wherein the processor is further configured to:

in response to configuring the first SIM card to receive the paging message at the first paging occasions of the collided paging occasions, send first paging configuration information to a corresponding first network side device through the first SIM card, wherein the first paging configuration information indicates that the corresponding first network side device pages the first SIM card at the first paging occasions; and/or in response to configuring the second SIM card to receive the paging message at the second paging occasions of the collided paging occasions, send second paging configuration information to a corresponding second network side device through the second SIM card, wherein the second paging configuration information indicates that the corresponding second network side device pages the second SIM card at the second paging occasions.

18. The electronic device of claim 17, wherein the processor is further configured to:

explicitly and/or implicitly indicate, to the corresponding first network side device through the first SIM card, a reason for reporting the first paging configuration information is collisions of paging occasions; and/or explicitly and/or implicitly indicate, to the corresponding second network side device through the second SIM card, a reason for reporting the second paging configuration information is collisions of paging occasions.

* * * * *